Figure 1:
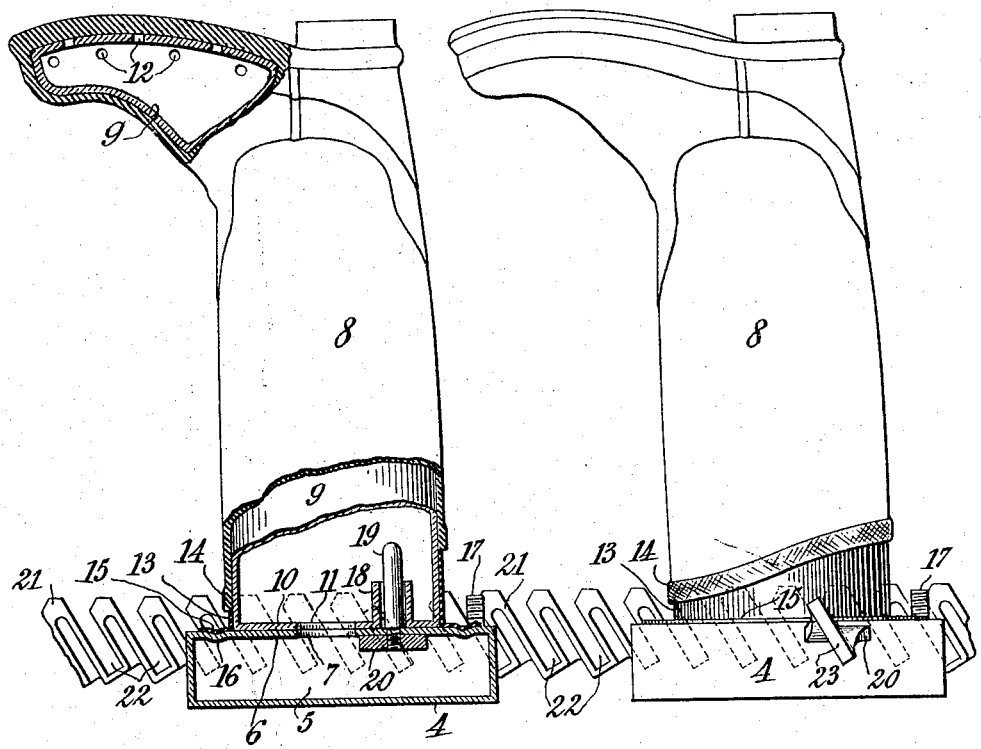

J. T. CROWLEY.
VULCANIZING APPARATUS.
APPLICATION FILED APR. 17, 1913.

1,122,695.

Patented Dec. 29, 1914.

WITNESSES:
René Bruine
Fred White

INVENTOR:
John T. Crowley,
By Attorneys,
Fraser, Dunk & Myers

UNITED STATES PATENT OFFICE.

JOHN T. CROWLEY, OF BEACON FALLS, CONNECTICUT, ASSIGNOR TO THE BEACON FALLS RUBBER SHOE COMPANY, OF BEACON FALLS, CONNECTICUT, A CORPORATION OF CONNECTICUT.

VULCANIZING APPARATUS.

1,122,695.  Specification of Letters Patent.  Patented Dec. 29, 1914.

Application filed April 17, 1913. Serial No. 761,747.

*To all whom it may concern:*

Be it known that I, JOHN T. CROWLEY, a citizen of the United States, residing in Beacon Falls, in the county of New Haven and State of Connecticut, have invented certain new and useful Improvements in Vulcanizing Apparatus, of which the following is a specification.

This invention relates to the vulcanizing of articles of india rubber and allied gums, and has for its object to provide simple and convenient means for establishing communication between a large number of hollow articles undergoing treatment and a vacuum apparatus or exhaust.

In the preparation of a hollow article for vulcanization it is desirable that the mass of material forming such article be homogeneous and compact, whether such article be composed of gum and a vulcanizing compound or such associated with one or more layers of fabric either incorporated within the mass or forming an inner surfacing or lining. Prior to and during vulcanization, in some instances, it is desirable to subject the outer surface of the hollow article to a different gas or to gas in a different condition from that to which the interior surface is subjected. For instance, it may be desirable to provide a pressure of the vulcanizing medium on the outer surface in excess of that on the inner surface, or to employ one gas on the outer surface and another on the inner, or to employ an aqueous gas on the outer surface and a dry or rarefied gas on the inner surface. When the articles undergoing treatment are mounted upon forms or patterns it is desirable to cause the material of which the articles are composed to closely adhere to such forms or molds, and if composed of gum and fabric to cause these to become compacted one with the other prior to the beginning of the vulcanizing; and that during the heat treatment the adherence to the form and between the various component layers be maintained.

The present improvement is for affording an apparatus or appliance whereby the hollow article may have its inner and its outer surfaces subjected simultaneously to the influence of different gases or vulcanizing media, and also, if desired, to differential pressures. This device is capable of employment in the manufacture or treatment of various hollow articles; as a concrete illustration a rubber boot has been selected from the multitude of available subjects.

In the drawings accompanying this specification one practicable embodiment of the invention is illustrated.

Figure 2:
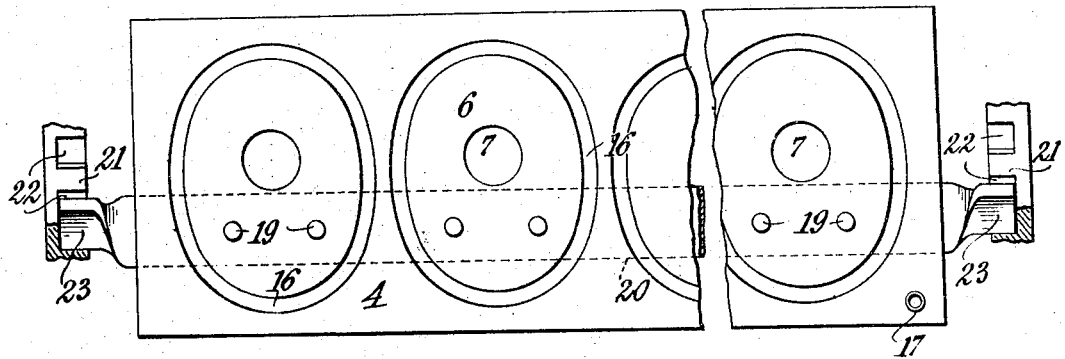

Figure 1 is a view showing two of the appliances, a boot mounted on each and a supporting rack, one of the appliances being shown in end elevation, and the other in cross-section, the boot mounted on the latter being broken away to reveal the form on which it is mounted, and such form also being broken away the better to show its manner of connection; and Fig. 2 is a plan view of one of the appliances and its supporting racks in cross-section.

In the illustration this appliance 4 is a hollow shell forming a vacuum chamber 5, and is in the form of an elongated bar. The walls of the chamber are shown formed of sheet metal. One side, 6, is adapted for receiving the articles to be treated. A longitudinally disposed series of openings 7 through the chamber wall are shown in this side. Such openings are for establishing communication between the vacuum chamber 5 and the hollow interior of the articles under treatment,—in the present illustration the boots 8. The top wall of the chamber is shown flat, such form being a convenient means of affording a plane surface surrounding each of the openings 7. A seat is thus afforded for the article undergoing treatment and for the form on which the same is mounted should one be employed. The contour of the surface will depend to an extent on that of the form and of the contiguous portion of the article being manufactured. The illustrated pattern or form is a metal last 9 having a flat end 10 for seating on the seat face 6, and a hole 11 for registering with the opening 7. The forms are pervious, preferably by the metal walls being provided with perforations 12. By being pervious communication is readily established between the interior of the hollow article and the vacuum chamber. To assure a tight joint the material of the article is extended in a margin 13 for overlaying the seat face 6. This margin or skirt may be an extension of the article itself or be of some other suitable gum or composition and be formed integral therewith or be attached thereto. In the illustration the boot ends at its top with a bead 14 from the edge of which the skirt will be cut after vulcanization. In the illustration the skirt extends over a substantial portion of the form surface to and beyond the juncture of the form base and vacuum chamber.

The overlaying or flange portion 15 of the skirt will be caused to adhere to the face of the seat either by its own adhesiveness, by cement, or by the formation of the seat. A sealing channel 16 is shown formed in the face of the seal and surrounding the openings 7. Upon the application of differential pressure, wherein the outer side is subjected to a greater relative pressure than is the hollow interior, the skirt will be drawn or forced into such channel and thereby make a tight joint. This may be supplemented by cement, or by adhesive material in the skirt.

The vacuum chamber is provided with a suitable connection for an exhaust or vacuum apparatus. Such a connection is illustrated at 17.

The articles undergoing treatment are preferably positioned on their seats by some securing or retaining device. In the present illustration they are held in place by means of pins and sockets on the forms and vacuum chamber walls. The end of each form is shown provided with a pair of ferruled openings 18 for the reception of pins 19. These openings and pins for each article or form are located within the seat area, and are shown located within the inclosure of the sealing channel 16. It has been found desirable to construct the vacuum chamber walls of thin metal. When heavy articles, such as heavy boots, are being treated and these mounted on metal lasts rather too much weight is present to be supported by the thin chamber walls. A supporting bar 20 is therefore provided. This is shown flat and mounted on the inner side of the flat top wall 6, adjacent to the longitudinal series of openings 7. The pins 19 are shown passing through the wall 6 and tapped into the bar 20. The shoulders at the inner ends of the screw-threaded ends clamp the wall 6 to the bar 20. The articles are placed on their forms, when forms are employed, and seated in proper position on the vacuum chamber bar 4, this being first done in the work-room; and the bar, with others, is placed in any usual vulcanizer.

Racks 21 are provided for engaging the ends of the bars 4 and supporting them. The racks may be secured in the chamber of the vulcanizer. In practice I have placed them on carriers or cars such as are in general use in rubber factories. Each of the racks is shown provided with a series of sockets 22. The sockets are shown as narrow slots disposed to an angle of about thirty degrees to the vertical. The ends of the supporting bar 20 are extended beyond the ends of the vacuum chamber to form supporting or rack-engaging lugs 23. The ends of the bar 20 are upset slightly to increase the thickness and the lugs twisted into a plane at an angle of about sixty degrees to the plane of the wall 6. When the lugs are in the recesses or sockets 22 the seat faces or the wall 6 will be in a horizontal plane. This permits close packing of the goods on the car in order to economize space in the vulcanizer.

Although but one embodiment of the invention is shown and but one employment specifically described, it will be apparent that these are illustrative of the invention and that changes may be made within the scope of the claims without departing from the spirit of the invention.

I claim as my invention:

1. The combination with a vacuum chamber provided with an opening through one of its walls, and a plane surface on the outer side of such wall forming a seat for a form and an article under treatment, and a sealing channel in such seat surface surrounding the said opening, of means for positioning a form on the said seat.

2. A vulcanizing device comprising a vacuum chamber, a series of openings through the walls thereof, and a sealing channel surrounding each such opening.

3. A vulcanizing apparatus comprising a vacuum chamber embodying a bar-like structure provided on one of its sides with a plurality of substantially flat sealing faces, each of such faces constituting a form seat, such side having an opening through it at each of such form seats, and supporting rack engaging means carried by the said bar-like structure.

4. In a vulcanizing apparatus, the combination with a vacuum chamber embodying a bar-like structure provided on one of its sides with a plurality of substantially flat sealing faces, each of such faces constituting a form seat, such side having an opening through it at each of such form seats, of means associated with each such sealing faces for holding a hollow article in registry with the opening therethrough and supporting rack engaging means carried by the said bar-like structure.

5. In a vulcanizing apparatus, the combination with a vacuum chamber embodying a bar-like structure having a flat side, a series of openings through such flat side, and a sealing channel surrounding each such opening, of a series of hollow metal forms each having a flat end provided with an opening, the said flat end being of a size and shape to interchangeably lie within the said sealing channels, and mating pins and sockets on the forms and bar for locating the forms in proper positions relatively to the openings and sealing channels.

6. In a vulcanizing apparatus, the combination with a vacuum chamber embodying an elongated structure having sheet metal side walls, one of such walls being flat, a longitudinally disposed series of openings through such flat side, and a sealing channel surrounding each such opening, of a flat supporting bar mounted on such flat side adjacent the series of openings and having its ends extending beyond the ends of the vacuum chamber and bent in a plane at an angle to the plane of such flat side, and fastening devices carried by the said supporting bar adjacent the respective openings of said series.

7. In a vulcanizing apparatus, the combination with a sheet metal vacuum chamber having a series of openings, of a supporting bar carried by one side of said chamber and having support-engaging portions, and a series of form supports mounted on the said supporting bar.

8. In a vulcanizing apparatus the combination with a vacuum chamber having a series of flat seats for articles under treatment, of broad flat supporting lugs carrying the said chamber, the flat faces of the lugs being disposed at an angle of about sixty degrees to the plane of said seats, a vulcanizing chamber, and racks in the said vulcanizing chamber having recesses for the said lugs disposed at an angle of about thirty degrees to the vertical, whereby the said seats are maintained in a horizontal plane.

9. A rack for a vulcanizer comprising a supporting bar carrying a series of form-engaging means, and a vacuum chamber carried by the bar and provided with a series of form seats, the form seats being respectively located adjacent the form-engaging means, the wall of such chamber having an opening for each form seat.

10. In a vulcanizing apparatus, the combination with a vacuum chamber having a plurality of openings, of a plurality of forms respectively, having openings for mating with the chamber openings, and interconnecting means adapted for ready connection and disconnection between the vacuum chamber and the forms, and adapted when connected for maintaining such openings in register, the wall of the vacuum chamber having substantially flat seal-engaging surfaces surrounding the forms.

In witness whereof, I have hereunto signed my name in the presence of two subscribing witnesses.

JOHN T. CROWLEY.

Witnesses:
J. U. FERRIS,
V. T. ANDERSON.

Copies of this patent may be obtained for five cents each, by addressing the "Commissioner of Patents, Washington, D. C."